United States Patent
Buck et al.

(10) Patent No.: US 9,977,692 B2
(45) Date of Patent: *May 22, 2018

(54) METHODS AND SYSTEMS FOR PROVISIONING A VIRTUAL RESOURCE IN A MIXED-USE SERVER

(71) Applicant: IndependenceIT, Inc., Allentown, PA (US)

(72) Inventors: Charles F. Buck, Kempton, PA (US); Jason A. Shivok, Easton, PA (US)

(73) Assignee: COUDJUMPER CORPORATION, Garner, NC (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/416,024

(22) Filed: Jan. 26, 2017

(65) Prior Publication Data

US 2017/0139739 A1   May 18, 2017

Related U.S. Application Data

(63) Continuation of application No. 14/990,246, filed on Jan. 7, 2016, now Pat. No. 9,612,861, which is a (Continued)

(51) Int. Cl.
*G06F 9/455* (2018.01)
*H04L 29/06* (2006.01)
(Continued)

(52) U.S. Cl.
CPC ...... *G06F 9/45558* (2013.01); *G06F 9/45533* (2013.01); *G06F 9/5077* (2013.01); (Continued)

(58) Field of Classification Search
CPC ..... G06F 9/45533; G06F 9/45558; G06F 9/52
(Continued)

(56) References Cited

U.S. PATENT DOCUMENTS 8,443,077 B1   5/2013   Lappas et al.
8,533,724 B1   9/2013   Theimer et al.
(Continued)

OTHER PUBLICATIONS

Apostol et al., "Efficient Manager for Virtualized Resource Provisioning in Cloud Systems", IEEE, 2011.
(Continued)

*Primary Examiner* — Phillip H Nguyen
(74) *Attorney, Agent, or Firm* — Blueshift IP, LLC; Cynthia M. Gilbert, Esq.

(57) ABSTRACT

A method for provisioning a virtualized resource includes directing, by a provisioning machine, a server-executed hypervisor to provision a virtual machine. The provisioning machine directs generation of an organizational unit within a first organizational unit within a multi-tenant directory service separated from a second organizational unit in the multi-tenant directory service by a firewall. The provisioning machine associates the virtual machine with the first organizational unit. The provisioning machine establishes at least one firewall rule on the virtual machine restricting communications to the virtual machine to communications from explicitly authorized machines, which including at least one other machine within the organizational unit. The provisioning machine receives a request to provision a virtualized resource for at least one user. The provisioning machine updates data associated with the organizational unit to include an identification of the at least one user. The provisioning machine directs the virtual machine to host the virtualized resource.

7 Claims, 9 Drawing Sheets

Related U.S. Application Data continuation of application No. 14/721,154, filed on May 26, 2015, now Pat. No. 9,262,200.

(60) Provisional application No. 62/016,728, filed on Jun. 25, 2014.

(51) Int. Cl.
*G06F 9/52* (2006.01)
*G06F 9/50* (2006.01)

(52) U.S. Cl.
CPC ............ *G06F 9/52* (2013.01); *H04L 63/0263* (2013.01); *H04L 63/08* (2013.01); *G06F 2009/4557* (2013.01); *G06F 2009/45562* (2013.01); *G06F 2009/45595* (2013.01); *H04L 63/083* (2013.01); *H04L 63/0861* (2013.01)

(58) Field of Classification Search
USPC ..................................... 718/1, 104
See application file for complete search history.

(56) References Cited

U.S. PATENT DOCUMENTS

| | | |
|---|---|---|
| 8,972,980 B2 | 3/2015 | Banga et al. |
| 9,148,428 B1 | 9/2015 | Banga |
| 2010/0198960 A1 | 8/2010 | Kirschnick |
| 2010/0293544 A1 | 11/2010 | Wilson |
| 2012/0180041 A1* | 7/2012 | Fletcher .............. G06F 9/45558 718/1 |
| 2012/0246740 A1 | 9/2012 | Brooker et al. |
| 2013/0042237 A1 | 2/2013 | Cardona |
| 2013/0054426 A1* | 2/2013 | Rowland ............... G06F 9/5011 705/27.2 |

OTHER PUBLICATIONS

Wu et al., "Virtual Machine Management Based on Agent Service", IEEE, 2010.

\* cited by examiner

METHODS AND SYSTEMS FOR PROVISIONING A VIRTUAL RESOURCE IN A MIXED-USE SERVER

CROSS-REFERENCE TO RELATED APPLICATIONS

This application is a is a continuation of U.S. patent application Ser. No. 14/990,246, filed on Jan. 7, 2016, entitled "Methods and Systems for Provisioning a Virtual Resource in a Mixed-Use Server," which is a continuation of U.S. Pat. No. 9,262,200, filed on May 26, 2015, entitled "Methods and Systems for Provisioning a Virtual Resource in a Mixed-Use Server," which claims priority from U.S. Provisional Patent Application No. 62/016,728, filed on Jun. 25, 2014, entitled "Methods and Systems for Provisioning a Virtual Resource in a Mixed-Use Server," each of which is hereby incorporated by reference.

BACKGROUND

The disclosure relates to provisioning resources. More particularly, the methods and systems described herein relate to functionality for provisioning a virtual resource in a mixed-use server.

BRIEF SUMMARY

In one aspect, a method for provisioning a virtualized resource in a mixed-use virtualization environment includes directing, by a provisioning machine, a hypervisor executing on a server, to provision a virtual machine on the server. The method includes directing, by the provisioning machine, the generation of a first organizational unit within a multi-tenant directory service separated from a second organizational unit in the multi-tenant directory service by a firewall. The method includes associating, by the provisioning machine, the virtual machine with the first organizational unit. The method includes establishing, by the provisioning machine, at least one firewall rule on the virtual machine restricting communications to the virtual machine to communications from explicitly authorized machines, the explicitly authorized machines including at least one other machine within the first organizational unit. The method includes receiving, by the provisioning machine, from a management component, a request to provision a virtualized resource for at least one user within an organization, the request received after the provisioning of the virtual machine and generation of the first organizational unit. The method includes updating, by the provisioning machine, data associated with the first organizational unit to include an identification of the at least one user. The method includes directing, by the provisioning machine, the virtual machine to host the virtualized resource.

In another aspect, a method for providing access to a virtualized resource in a mixed-use virtualization environment includes receiving, by a service broker machine, from a client machine, at least one credential. The method includes requesting, by the service broker machine, from a database, connection information associated with the at least one credential. The method includes receiving, by the service broker machine, from the database, connection information. The connection information includes an identification of a data center. The connection information includes an identification of at least one virtual machine in the data center. The at least one virtual machine is (i) associated with a first organization, (ii) designated to provide access to at least one virtual resource for a user associated with the at least one credential, and (iii) executing on a physical server hosting a second virtual machine associated with a second organization and providing shared sessions to users of the second organization. The connection information includes an identification of a resource username for use in connecting to the at least one virtual machine. The method includes providing, by the service broker machine, to the client machine, the connection information.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

In some embodiments, the methods and systems described herein provide functionality for provisioning a virtual resource in a mixed-use server. Before describing these methods and systems in detail, however, a description is provided of a network in which such methods and systems may be implemented.

Figure 1A:
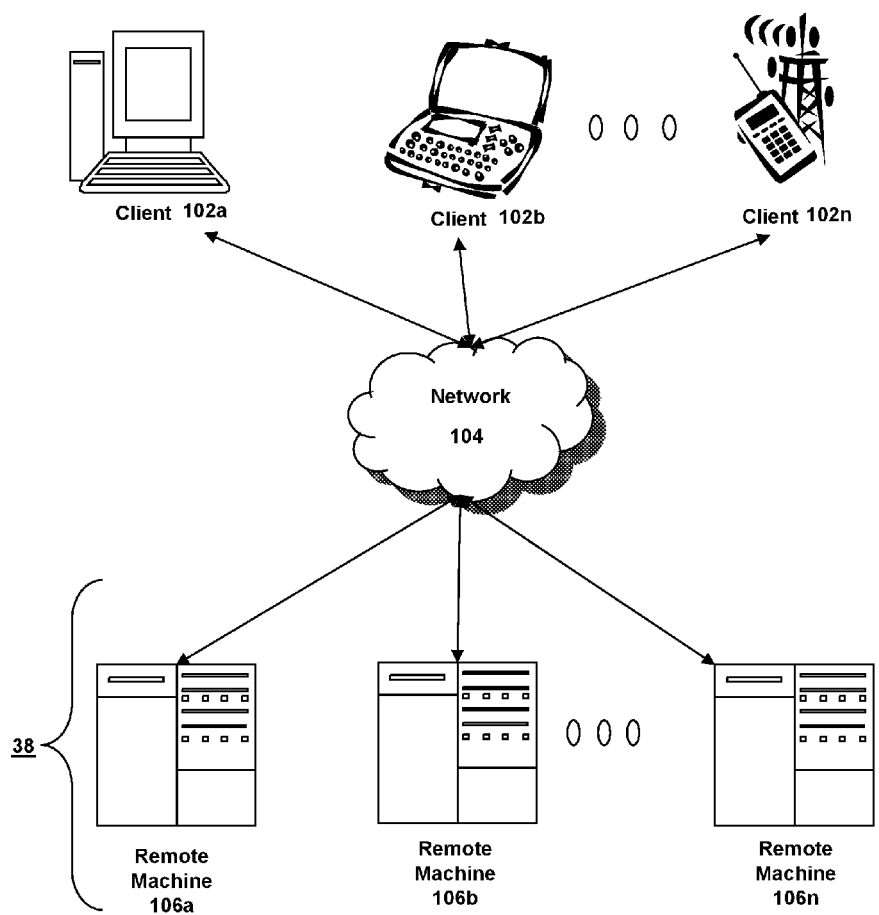
FIGS. 1A-1C are block diagrams depicting embodiments of computers useful in connection with the methods and systems described herein.

Referring now to FIG. 1A, an embodiment of a network environment is depicted. In brief overview, the network environment comprises one or more clients 102a-102n (also generally referred to as local machine(s) 102, client(s) 102, client node(s) 102, client machine(s) 102, client computer(s) 102, client device(s) 102, computing device(s) 102, endpoint(s) 102, or endpoint node(s) 102) in communication with one or more remote machines 106a-106n (also generally referred to as server(s) 106 or computing device(s) 106) via one or more networks 104.

Although FIG. 1A shows a network 104 between the clients 102 and the remote machines 106, the clients 102 and the remote machines 106 may be on the same network 104. The network 104 can be a local area network (LAN), such as a company Intranet, a metropolitan area network (MAN), or a wide area network (WAN), such as the Internet or the World Wide Web. In some embodiments, there are multiple networks 104 between the clients 102 and the remote machines 106. In one of these embodiments, a network 104' (not shown) may be a private network and a network 104 may be a public network. In another of these embodiments, a network 104 may be a private network and a network 104' a public network. In still another embodiment, networks 104 and 104' may both be private networks. In yet another embodiment, networks 104 and 104' may both be public networks.

The network 104 may be any type and/or form of network and may include any of the following: a point to point network, a broadcast network, a WAN, a LAN, a telecommunications network, a data communication network, a computer network, an ATM (Asynchronous Transfer Mode) network, a SONET (Synchronous Optical Network) network, an SDH (Synchronous Digital Hierarchy) network, a wireless network, and a wireline network. In some embodiments, the network 104 may comprise a wireless link, such as an infrared channel or satellite band. The topology of the network 104 may be a bus, star, or ring network topology. The network 104 may be of any such network topology as known to those ordinarily skilled in the art capable of supporting the operations described herein. The network may comprise mobile telephone networks utilizing any protocol or protocols used to communicate among mobile devices (including tablets and handheld devices generally), including AMPS, TDMA, CDMA, GSM, GPRS, or UMTS. In some embodiments, different types of data may be transmitted via different protocols. In other embodiments, the same types of data may be transmitted via different protocols.

A client 102 and a remote machine 106 (referred to generally as computing devices 100) can be any workstation, desktop computer, laptop or notebook computer, server, portable computer, mobile telephone or other portable telecommunication device, media playing device, a gaming system, mobile computing device, or any other type and/or form of computing, telecommunications or media device that is capable of communicating on any type and form of network and that has sufficient processor power and memory capacity to perform the operations described herein. A client 102 may execute, operate or otherwise provide an application, which can be any type and/or form of software, program, or executable instructions, including, without limitation, any type and/or form of web browser, web-based client, client-server application, an ActiveX control, or a Java applet, or any other type and/or form of executable instructions capable of executing on client 102.

In one embodiment, a computing device 106 provides functionality of a web server. In some embodiments, a web server 106 comprises an open-source web server, such as the APACHE servers maintained by The Apache Software Foundation of Forest Hill, Md. In other embodiments, the web server executes proprietary software, such as the Internet Information Services products provided by Microsoft Corporation of Redmond, Wash., the Oracle iPlanet web server products provided by Oracle Corporation of Redwood Shores, Calif., or the BEA WEBLOGIC products provided by BEA Systems of Santa Clara, Calif.

In some embodiments, the system may include multiple, logically-grouped remote machines 106. In one of these embodiments, the logical group of remote machines may be referred to as a server farm 38. In another of these embodiments, the server farm 38 may be administered as a single entity.

Figure 1B:
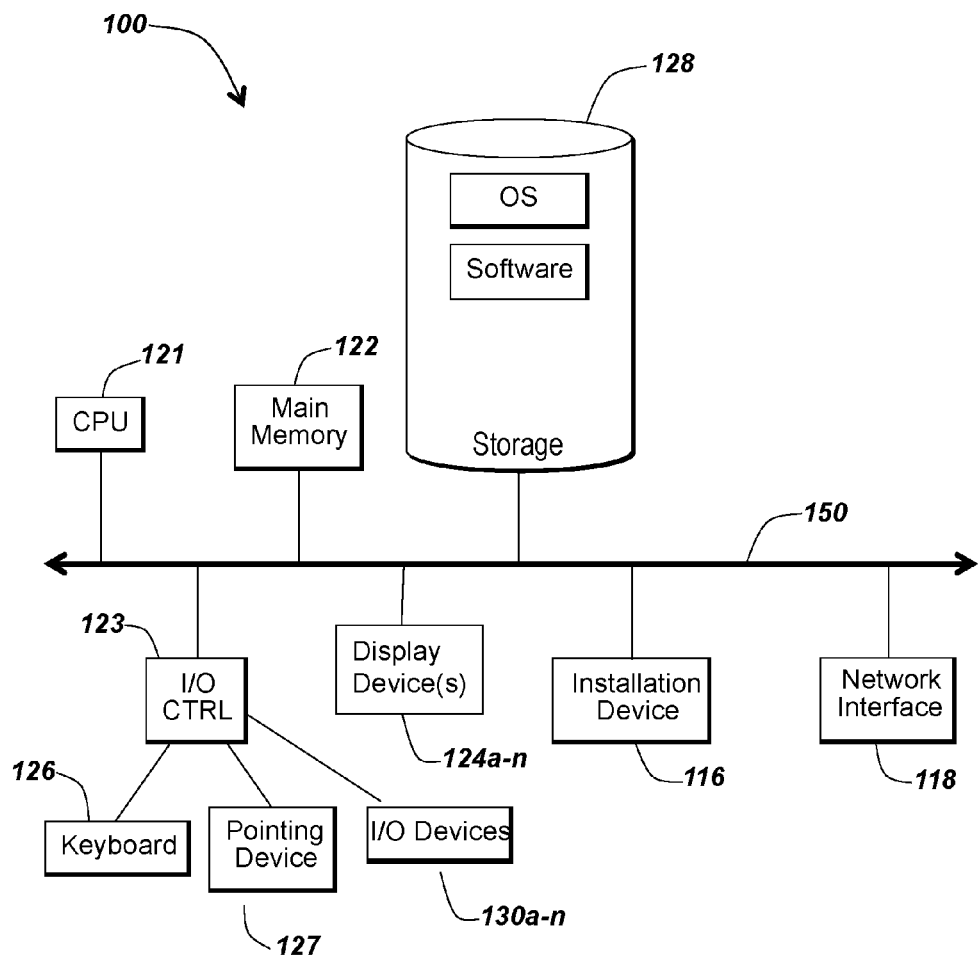
Figure 1C:
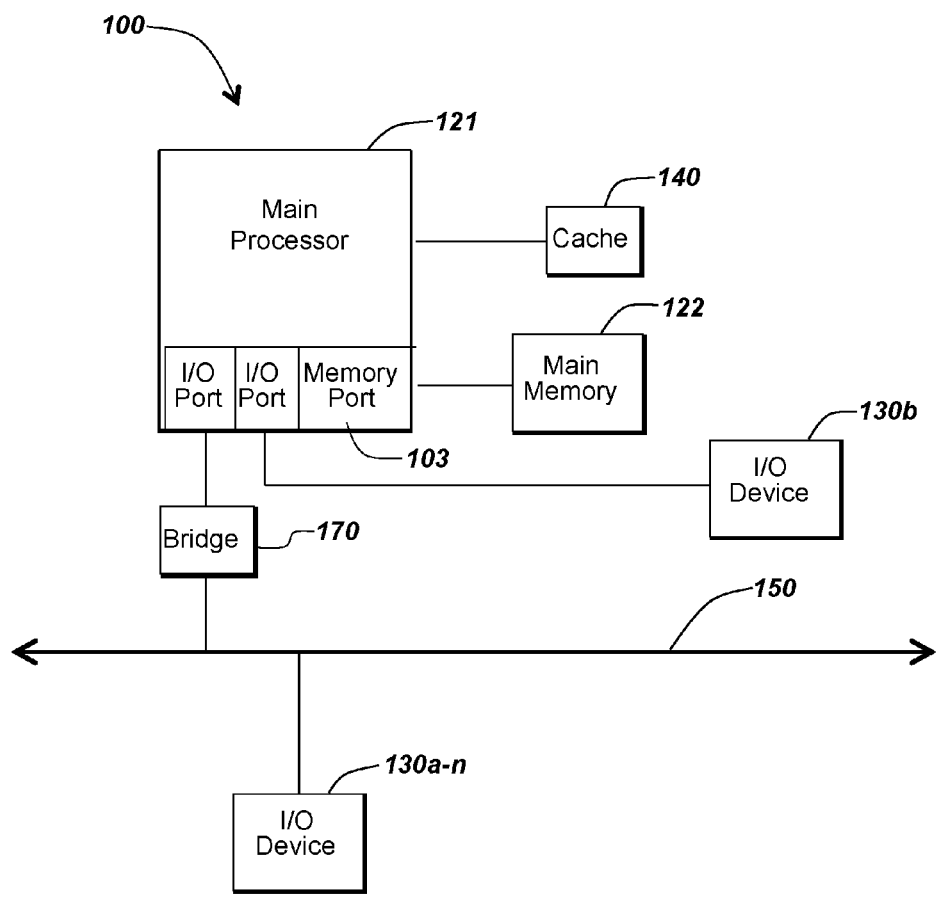

FIGS. 1B and 1C depict block diagrams of a computing device 100 useful for practicing an embodiment of the client 102 or a remote machine 106. As shown in FIGS. 1B and 1C, each computing device 100 includes a central processing unit 121, and a main memory unit 122. As shown in FIG. 1B, a computing device 100 may include a storage device 128, an installation device 116, a network interface 118, an I/O controller 123, display devices 124a-n, a keyboard 126, a pointing device 127, such as a mouse, and one or more other I/O devices 130a-n. The storage device 128 may include, without limitation, an operating system and software. As shown in FIG. 1C, each computing device 100 may also include additional optional elements, such as a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; those manufactured by International Business Machines of White Plains, N.Y.; or those manufactured by Advanced Micro Devices of Sunnyvale, Calif. Other examples include SPARC processors, ARM processors, processors used to build UNIX/LINUX boxes, and processors for mobile devices. The computing device 100 may be based on any of these processors, or any other processor capable of operating as described herein.

Main memory unit 122 may be one or more memory chips capable of storing data and allowing any storage location to be directly accessed by the microprocessor 121. The main memory 122 may be based on any available memory chips capable of operating as described herein. In the embodiment shown in FIG. 1B, the processor 121 communicates with main memory 122 via a system bus 150. FIG. 1C depicts an embodiment of a computing device 100 in which the processor 121 communicates directly with main memory 122 via a memory port 103. FIG. 1C also depicts an embodiment in which the main processor 121 communicates directly with cache memory 140 via a secondary bus, sometimes referred to as a backside bus. In other embodiments, the main processor 121 communicates with cache memory 140 using the system bus 150.

In the embodiment shown in FIG. 1B, the processor 121 communicates with various I/O devices 130 via a local system bus 150. Various buses may be used to connect the central processing unit 121 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 may use an Advanced Graphics Port (AGP) to communicate with the display 124. FIG. 1C depicts an embodiment of a computer 100 in which the main processor 121 also communicates directly with an I/O device 130b via, for example, HYPERTRANSPORT, RAPIDIO, or INFINIBAND communications technology.

A wide variety of I/O devices 130a-130n may be present in the computing device 100. Input devices include keyboards, mice, trackpads, trackballs, microphones, scanners, cameras, and drawing tablets. Output devices include video displays, speakers, inkjet printers, laser printers, and dye-sublimation printers. The I/O devices may be controlled by an I/O controller 123 as shown in FIG. 1B. Furthermore, an I/O device may also provide storage and/or an installation medium 116 for the computing device 100. In some embodiments, the computing device 100 may provide USB connections (not shown) to receive handheld USB storage devices such as the USB Flash Drive line of devices manufactured by Twintech Industry, Inc. of Los Alamitos, Calif.

Referring still to FIG. 1B, the computing device 100 may support any suitable installation device 116, such as a floppy disk drive for receiving floppy disks such as 3.5-inch, 5.25-inch disks or ZIP disks; a CD-ROM drive; a CD-R/RW drive; a DVD-ROM drive; tape drives of various formats; a USB device; a hard-drive or any other device suitable for installing software and programs. In some embodiments, the computing device 100 may provide functionality for installing software over a network 104. The computing device 100 may further comprise a storage device, such as one or more hard disk drives or redundant arrays of independent disks, for storing an operating system and other software. Alternatively, the computing device 100 may rely on memory chips for storage instead of hard disks.

Furthermore, the computing device 100 may include a network interface 118 to interface to the network 104 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, 802.15.4, ZIGBEE, CDMA, GSM, WiMax, and direct asynchronous connections). In one embodiment, the computing device 100 communicates with other computing devices 100' via any type and/or form of gateway or tunneling protocol such as Secure Socket Layer (SSL) or Transport Layer Security (TLS). The network interface 118 may comprise a built-in network adapter, network interface card, PCMCIA network card, card bus network adapter, wireless network adapter, USB network adapter, modem, or any other device suitable for interfacing the computing device 100 to any type of network capable of communication and performing the operations described herein.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. One ordinarily skilled in the art will recognize and appreciate the various ways and embodiments that a computing device 100 may be configured to have multiple display devices 124a-124n.

In further embodiments, an I/O device 130 may be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 100 of the sort depicted in FIGS. 1B and 1C typically operates under the control of operating systems, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 3.x, WINDOWS 95, WINDOWS 98, WINDOWS 2000, WINDOWS NT 3.51, WINDOWS NT 4.0, WINDOWS CE, WINDOWS XP, WINDOWS 7, WINDOWS 8, and WINDOWS VISTA, all of which are manufactured by Microsoft Corporation of Redmond, Wash.; MAC OS manufactured by Apple Inc. of Cupertino, Calif.; OS/2 manufactured by International Business Machines of Armonk, N.Y.; Linux, a freely-available operating system distributed by Caldera Corp. of Salt Lake City, Utah; Ubuntu, a freely-available operating system distributed by Canonical Ltd. of London, England; or any type and/or form of a Unix operating system, among others.

The computing device 100 can be any workstation, desktop computer, laptop or notebook computer, server, portable computer, mobile telephone or other portable telecommunication device or personal digital assistant, media playing device (including, without limitation, a digital audio player, portable media player, or computing device providing media playing functionality), a gaming system, mobile computing device, or any other type and/or form of computing, telecommunications or media device that is capable of communication and that has sufficient processor power and memory capacity to perform the operations described herein. In some embodiments, the computing device 100 may have different processors, operating systems, and input devices consistent with the device. In other embodiments, the computing device 100 comprises a combination of devices, such as a mobile phone combined with a digital audio player or portable media player.

Figure 1D:
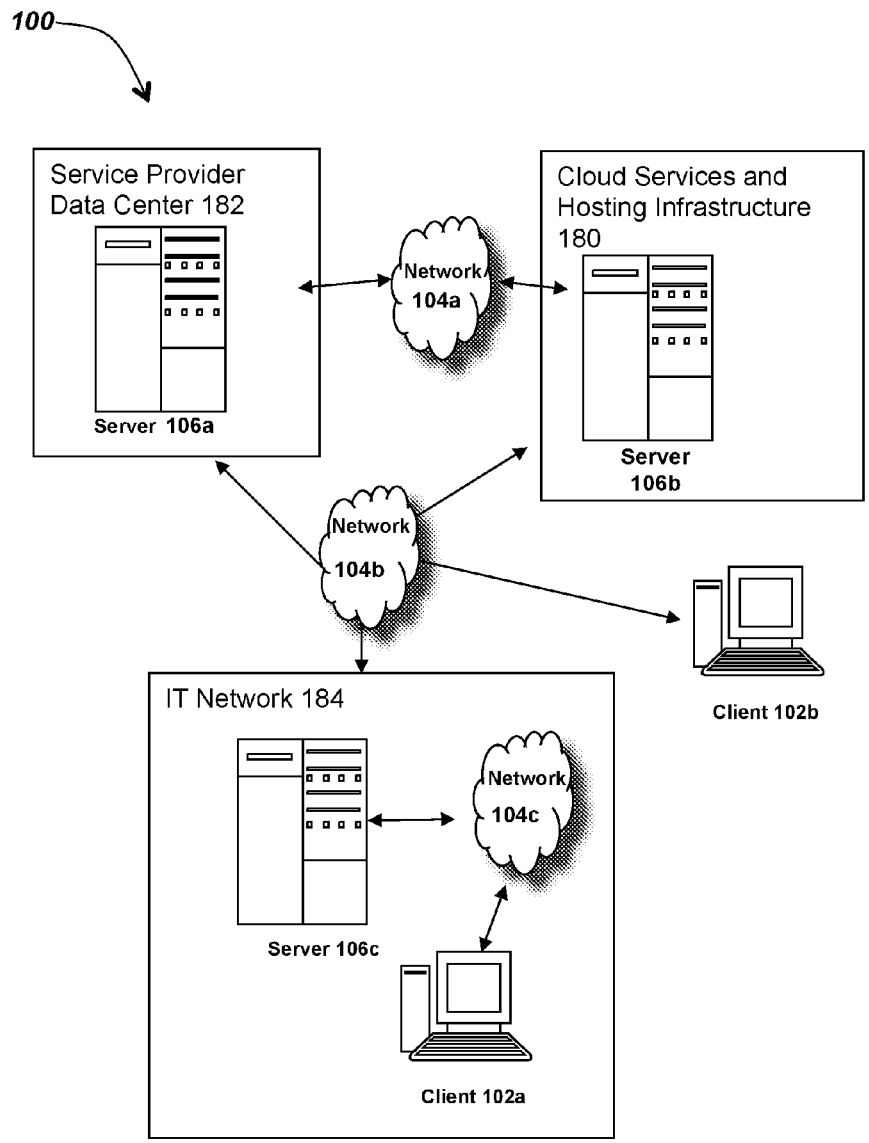
FIG. 1D is a block diagram depicting one embodiment of a system in which a plurality of networks provide data hosting and delivery services.

Referring now to FIG. 1D, a block diagram depicts one embodiment of a system in which a plurality of networks provide hosting and delivery services. In brief overview, the system includes a cloud services and hosting infrastructure 180, a service provider data center 182, and an information technology (IT) network service center 184.

In one embodiment, the data center 182 includes computing devices such as, without limitation, servers (including, for example, application servers, file servers, databases, and backup servers), routers, switches, and telecommunications equipment. In another embodiment, the cloud services and hosting infrastructure 180 provides access to, without limitation, storage systems, databases, application servers, desktop servers, directory services, web servers, as well as services for accessing remotely located hardware and software platforms. In still other embodiments, the cloud services and hosting infrastructure 180 includes a data center 182. In other embodiments, however, the cloud services and hosting infrastructure 180 relies on services provided by a third-party data center 182. In some embodiments, the IT network 104c may provide local services, such as mail services and web services. In other embodiments, the IT network 104c may provide local versions of remotely located services, such as locally-cached versions of remotely-located print servers, databases, application servers, desktop servers, directory services, and web servers. In further embodiments, additional servers may reside in the cloud services and hosting infrastructure 180, the data center 182, or other networks altogether, such as those provided by third-party service providers including, without limitation, infrastructure service providers, application service providers, platform service providers, tools service providers, web site hosting services, and desktop service providers.

In one embodiment, a user of a client 102 accesses services provided by a remotely located server 106a. For instance, an administrator of an enterprise IT network service center 184 may determine that a user of the client 102a will access an application executing on a virtual machine executing on a remote server 106a. As another example, an individual user of a client 102b may use a resource provided to consumers by the remotely located server 106 (such as email, fax, voice or other communications service, data backup services, or other service).

As depicted in FIG. 1D, the data center 182 and the cloud services and hosting infrastructure 180 are remotely located from an individual or organization supported by the data center 182 and the cloud services and hosting infrastructure 180; for example, the data center 182 may reside on a first network 104a and the cloud services and hosting infrastructure 180 may reside on a second network 104b, while the IT network 104c is a separate, third network 104c. In other embodiments, the data center 182 and the cloud services and hosting infrastructure 180 reside on a first network 104a and the IT network service center 184 is a separate, second network 104c. In still other embodiments, the cloud services and hosting infrastructure 180 resides on a first network 104a while the data center 182 and the IT network service center 184 form a second network 104c. Although FIG. 1D depicts only one server 106a, one server 106b, one server 106c, two clients 102, and three networks 104, it should be understood that the system may provide multiple ones of any or each of those components. The servers 106, clients 102, and networks 104 may be provided as described above in connection with FIGS. 1A-1C.

Therefore, in some embodiments, an IT infrastructure may extend from a first network—such as a network owned and managed by an individual or an enterprise—into a second network, which may be owned or managed by a separate entity than the entity owning or managing the first network. Resources provided by the second network may be said to be "in a cloud." Cloud-resident elements may include, without limitation, storage devices, servers, databases, computing environments (including virtual machines, servers, and desktops), and applications. For example, the IT network 184 may use a remotely located data center 182 to store servers (including, for example, application servers, file servers, databases, and backup servers), routers, switches, and telecommunications equipment. The data center 182 may be owned and managed by the IT network service center 184 or a third-party service provider (including, for example, a cloud services and hosting infrastructure provider) may provide access to a separate data center 182.

In some embodiments, one or more networks providing computing infrastructure on behalf of customers is referred to as a cloud. In one of these embodiments, a system in which users of a first network access at least a second network including a pool of abstracted, scalable, and managed computing resources capable of hosting resources may be referred to as a cloud computing environment. In another of these embodiments, resources may include, without limitation, virtualization technology, data center resources, applications, and management tools. In some embodiments, Internet-based applications (which may be provided via a "software-as-a-service" model) may be referred to as cloud-based resources. In other embodiments, networks that provide users with computing resources, such as remote servers, virtual machines, or blades on blade servers, may be referred to as compute clouds or "infrastructure-as-a-service" providers. In still other embodiments, networks that provide storage resources, such as storage area networks, may be referred to as storage clouds. In further embodiments, a resource may be cached in a local network and stored in a cloud.

In some embodiments, some or all of a plurality of remote machines 106 may be leased or rented from third-party companies such as, by way of example and without limitation, Amazon Web Services LLC of Seattle, Wash.; Rackspace US, Inc. of San Antonio, Tex.; Microsoft Corporation of Redmond, Wash.; and Google Inc. of Mountain View, Calif. In other embodiments, all the hosts 106 are owned and managed by third-party companies including, without limitation, Amazon Web Services LLC, Rackspace US, Inc., Microsoft Corporation, and Google Inc.

Computing resources generally may include, without limitation, physical or virtualized computing components that user machines 100 may access directly or over a network 104. For example, and without limitation, the computing resources may include computers 100 as described above in connection with FIGS. 1A-1D. By way of further example, the computing resources may include physical computers, virtual computers, virtual computer components (such as hard drives), physical computers (including, by way of example, blades on blade servers or other types of shared or dedicated servers), memory, network devices, databases, input/output systems, operating system software, application software, or any type of software. In other embodiments, the computing resources act as intermediaries and provide access to other remote machines. For example, a first computing resource may provide access to a second machine 106b that executes software made available over the network 104; by way of example, a software-as-a-service provider may execute software on a second machine 106b that a user can access via the first computing resource.

In some embodiments, information technology (IT) service providers leverage virtual resources when providing services to end users. Such embodiments typically employ software applications referred to as hypervisors that execute on a physical machine (which may be referred to as a host machine) to virtualize physical hardware and mediate between virtualized resources and physical resources of the host machine.

In some environments (which may be referred to as virtualization environments), a machine 106 includes a hypervisor layer, a virtualization layer, and a hardware layer. The hypervisor layer includes a hypervisor that allocates and manages access to a number of physical resources in the hardware layer (e.g., the processor(s) and disk(s)) by at least one virtualized resource executing in the virtualization layer. The virtualization layer includes at least one operating system and a plurality of virtual resources allocated to the at least one operating system. Virtual resources may include, without limitation, a plurality of virtual processors and virtual disks, as well as virtual resources such as virtual memory and virtual network interfaces. The plurality of virtual resources and the operating system may be referred to as a virtual machine. In some embodiments, a single user accesses the virtual machine; for example, a "power user" may have access to a dedicated virtual machine given the requirements of the user. In other embodiments, a plurality of users shares access to the virtual machine, each of the plurality executing one or more resources of the virtual machine. In some embodiments in which a service provider gives users access to a virtualized desktop, the resources of the virtual machine may include one or more software applications. The resources of the virtual machine may also include functionality of virtualized servers including, without limitation, directory servers, host servers, application servers, file servers, proxy servers, network appliances, gateways, application gateways, gateway servers, virtualization servers, deployment servers, SSL VPN servers, firewalls, web servers, mail servers, security servers, database servers or any other server application.

A hypervisor may provide virtual resources to an operating system in any manner that simulates the operating system having access to a physical device. A hypervisor may provide virtual resources to any number of "guest" operating systems on a host server 106. In some embodiments, a computing device 100 executes one or more types of hypervisors. In these embodiments, hypervisors may be used to emulate virtual hardware, partition physical hardware, virtualize physical hardware, and execute virtual machines that provide access to computing environments. Hypervisors may include those manufactured by VMWare, Inc. of Palo Alto, Calif.; the XEN hypervisor, an open source product whose development is overseen by the open source Xen.org community; HyperV, VirtualServer or virtual PC hypervisors provided by Microsoft, or others.

In some embodiments, a hypervisor executes within an operating system executing on a computing device 100. In one of these embodiments, a computing device 100 executing an operating system and a hypervisor may be said to have a host operating system (the operating system executing on the computing device 100), and a guest operating system (an operating system executing within a computing resource partition provided by the hypervisor). In other embodiments, a hypervisor interacts directly with hardware on a computing device, instead of executing on a host operating system. In one of these embodiments, the hypervisor may be said to be executing on "bare metal," referring to the hardware comprising the computing device.

In some embodiments, the hypervisor controls processor scheduling and memory partitioning for a virtual machine executing on the computing device 100. In one of these embodiments, the hypervisor controls the execution of at least one virtual machine. In another of these embodiments, the hypervisor presents at least one virtual machine with an abstraction of at least one hardware resource provided by the computing device. In other embodiments, the hypervisor controls whether and how physical processor capabilities are presented to the virtual machine.

In some embodiments, the methods and systems described herein provide functionality for provisioning a virtual resource in a mixed-use server. In one of these embodiments, the methods and systems described herein provide functionality for securely creating a multi-tenant, virtual resource delivery platform. In another of these embodiments, a single physical resource pool, software-defined virtual local area network (VLAN), and directory service provide the virtual resource delivery platform. In one embodiment, the methods and systems described herein provide the benefit of allowing the service provider entity to leverage economy of scale on physical systems. Conventional licensing practices typically request that dedicated physical systems be provisioned for each customer entity in order to provide one to one mapping of virtual systems to individual users. Current operational practices typically require multiple VLANs to segment customer or departmental sections within a virtual infrastructure. The introduction of a software-defined "Virtual VLAN" extends the flexibility of the system to provide discrete, secure server instances using less network address space, while leveraging session-based licensing for personal virtual computing.

In other embodiments, the methods and systems described herein provide functionality for segregating resources provided by a single, multi-tenant machine. In one of these embodiments, the methods and systems described herein provide functionality allowing a service provider to implement security policies that prevent users of a first resource associated with a first entity, such as a company that is a customer of the service provider, from accessing a second resource associated with a second entity, such as a different company that is also a customer of the service provider. Such functionality may allow service providers to more efficiently use computing resources while satisfying the security requirements of their customers. Segregated resources may be any type or form of resource including, without limitation, directory services and desktop images.

Figure 2A:
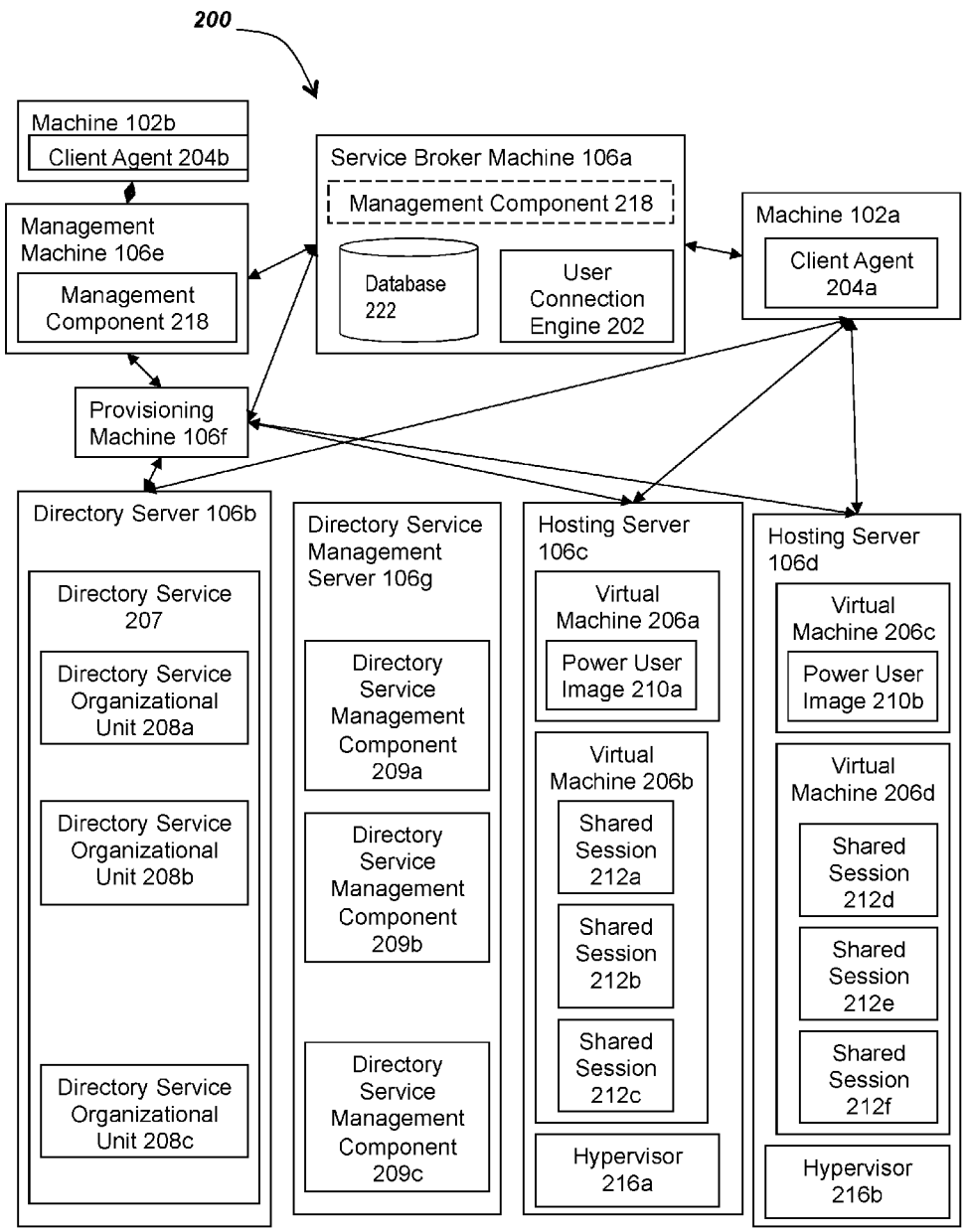
FIG. 2A is a block diagram depicting an embodiment of a system for provisioning a virtual resource in a mixed-use server.

Referring now to FIG. 2A, a block diagram depicts one embodiment of a system for provisioning a virtual resource in a mixed-use server. In brief overview, the system includes a service broker machine 106a, a directory server 106b, a first hosting server 106c, a second hosting server 106d, a management machine 106e, a provisioning machine 106f, a first machine 102a, and a second machine 102b. The system includes a management component 218 and a user connection engine 202. The system includes a database 222. The system includes a plurality of client agents 204a-n. The system includes a plurality of virtual machines 206a-n, a plurality of power user images 210a-n, a plurality of shared sessions 212a-n, and a plurality of hypervisors 216a-n. The system includes a directory service 207 and a plurality of directory service organizational units 208a-n. The system includes a directory service management server 106g and a plurality of directory service management components 209a-n.

In one embodiment, the service broker machine 106a is a machine 106 as described above. In another embodiment, the service broker machine 106a provides a web service listening for requests for connection from client agents 204a-n. In still another embodiment, the service broker machine 106a provides functionality for receiving requests for instructions regarding how to route user requests for access to virtualized resources (e.g., access requests). Such requests may be of any type or form including, without limitation, HTML5-generated queries.

In one embodiment, the service broker machine 106a executes a user connection engine 202. In some embodiments, any machine 100 providing the functionality of the user connection engine 202 may be referred to as the service broker machine 106a. The user connection engine 202 may provide the web service. The user connection engine 202 may provide functionality for receiving access requests from one or more machines 102. In some embodiments, the user connection engine 202 is a software program. In other embodiments, the user connection engine 202 is a hardware module. In some embodiments, the user connection engine 202 includes functionality for interacting with a database 222. For example, the user connection engine 202 may include functionality for connecting to the database 222 and requesting validation of user credentials received from a client agent 204. In some embodiments, the user connection engine 202 includes functionality for revising received user credentials to generate an information string usable to facilitate a log-in process; for example, the user connection engine 202 may ensure that a gateway address is of a form "someplaceGW.somedomain.net," that a resource name is of a form "someserver.insidesomedomain.net," and that a username is of a form "someresource\username.extension." The user connection engine 202 may include functionality for encrypting transmitted data. The user connection engine 202 may include functionality for logging connection information (e.g., date, time, IP address of connecting device, name of connecting device, connecting device type, and user credentials).

In other embodiments, the user connection engine 202 includes functionality for retrieving connection information on behalf of a user of the machine 102. For example, the user connection engine 202 may include functionality for accessing a database 222 to retrieve connection details, described in greater detail below. Connection details may include, without limitation, data center gateway identifiers, user domain identifiers, and authorized resource pool identifiers.

In some embodiments, examples of databases 222 include, without limitation, structured storage (e.g., NoSQL-type databases and BigTable databases), HBase databases distributed by The Apache Software Foundation, MongoDB databases distributed by 10Gen, Inc. of New York, N.Y., Cassandra databases distributed by The Apache Software Foundation, and document-based databases. In other embodiments, the database 222 is an ODBC-compliant database. For example, the database 222 may be provided as an ORACLE database, manufactured by Oracle Corporation of Redwood Shores, Calif. In other embodiments, the database 222 can be a Microsoft ACCESS database or a Microsoft SQL server database, manufactured by Microsoft Corporation of Redmond, Wash. In still other embodiments, the database 222 may be a custom-designed database based on an open source database, such as the MYSQL family of freely available database products distributed by Oracle Corporation. In further embodiments, the database may be any form or type of database.

In some embodiments, the service broker machine 106*a* receives requests from machines 102. A machine 102 may execute a client agent 204 with which it accesses the service broker machine 106*a*. In some embodiments, the client agent 204 is a conventional web browser that uses Internet protocols to connect over one or more networks 104 to the service broker machine 106*a*. In other embodiments, the client agent 204 is a non-browser program providing functionality for sending requests for access to virtualized resources to the service broker machine 106*a*. The client agent 204 may, therefore, be a software program. In other embodiments, the client agent 204 is a hardware module. In some embodiments, the client agent 204 transmits user credentials to the service broker machine 106*a*. Credentials may include usernames, passwords, biometric information, or other information for authentication of users. In one of these embodiments, however, the client agent 204 need not require a user of the machine 102 to know technical details about the machine 102 or about the requested access in order for the service broker machine 106*a* to provide access to a virtualized resource. In some embodiments, the client agent 204 provides functionality for establishing a connection to a login gateway identified by the service broker machine 106*a*.

In some embodiments, the systems described herein are architected as high capacity, fault tolerant, load balanced services running in multiple, geographically diverse data centers yet accessible via a single uniform resource locator (URL). Such a system may allow users to query one master web service via such a URL in order to access virtualized resources and, as a result, may simplify management for a service provider. For example, such a system permits system administrators to easily modify data center availability to manage resources, address maintenance requirements, and mitigate unexpected outages.

The system 200 may provide functionality for allowing administrators to manage one or more physical or virtual resources. Therefore, in one embodiment, the system 200 includes a management component 218. In some embodiments, the management component 218 is a software program. In other embodiments, the management component 218 is a hardware module. In still other embodiments, the management component 218 executes on a computing device 100. For example, a management machine 106*e* may provide a web site with which administrative users can manage various aspects of the services provided. In such an example, the web site may include data from, or interfaces to, the management component 218, and may provide a user interface for receiving commands from users of the web site and providing the commands to the management component 218. As another example, administrative users may directly access the management machine 106*e* (e.g., instead of accessing the web site remotely from a machine 102*b* (not shown)) and may interact with the management component directly. In embodiments in which the management component 218 executes on a separate management machine 106*e*, it may be in communication with the service broker machine 106*a*. In another embodiment, shown in shadow in FIG. 2A, the service broker machine 106*a* provides the management component 218. In such an embodiment, administrative users may access the management component 218 directly or indirectly (e.g., from a remote machine 102*b*).

The system 200 includes a directory server 106*b*. In some embodiments, the system 200 includes a plurality of directory servers 106*b*. In other embodiments, as will be described in further detail below, the directory server 106*b* provides a directory service 207 that includes a plurality of directory service organizational units 208*a-n*, each of which may be associated with one or more entities (e.g., organizations and companies). A directory service 207 may be any form or type of directory service, including those implementing a Lightweight Directory Access Protocol (LDAP). A directory service 207 may be an ACTIVE DIRECTORY provide by Microsoft Corporation.

The system includes a plurality of directory service management components 209*a-n*. In one embodiment, the plurality of directory service management components 209*a-n* execute on a directory service management server 106*g*. As will be discussed in greater detail below, the plurality of directory service management components 209*a-n* may provide functionality for interacting with the directory service 207. For example, the directory service management components 209*a-n* may include functionality for generating and transmitting instructions according to a directory service API in order to access and/or modify data stored by the directory service 207. The directory service management components 209*a-n* may also include functionality for receiving instructions from the provisioning machine 106*f* regarding access to, or modification of, data stored by the directory service 207.

In one embodiment, the provisioning machine 106*f* is a machine 106 as described above. In another embodiment, the provisioning machine 106*f* includes functionality for receiving an instruction (e.g., from the management component 218). In still another embodiment, the provisioning machine 106*f* includes functionality for interacting with one or more directory service management components 209*a-n*. For example, the provisioning machine 106*f* may include functionality for transmitting, to a directory service management component 209a, an instruction to access or to modify data within a directory service organizational unit 208a.

The system 200 includes a plurality of hosting servers 106 (shown in FIG. 2A as hosting servers 106c and 106d). The hosting servers 106 provide users of remote machines 102 with access to one or more virtualized resources. The hosting servers 106 may execute one or more hypervisors 216 to provide the virtualized resources. In one embodiment, the hosting servers 106 are physical devices that provide access to virtual resources (directly or indirectly, via a virtual machine executing on the hosting servers 106).

In some embodiments, the directory server 106b may receive instructions from the provisioning machine 106f and direct execution of the instructions on the directory server 106b via an Application Programming Interface (API). Similarly, the provisioning machine 106f may include functionality for communicating directly with a hypervisor 216a-n executing on the hosting servers 106c-n. In some embodiments, the provisioning machine 106f may include functionality for communicating with any of a variety of types of hypervisors.

In some embodiments, and as will be discussed in greater detail below, the hosting servers 106c-d and the directory server 106b may include a firewall with which various resources are separated from other resources and users associated with one organization may not access resources of other organizations, although the resources reside on the same physical hardware. The firewall may include policies for enforcing this separation. Although separated from resources on the same physical hardware associated with other organizations, the firewalled resources may have authorization to access firewalled resources on other physical machines, resulting in a type of virtual local area network.

The hosting servers 106c-106cd may be provided as "mixed-use" servers that provide access to both private virtualized resources dedicated to single users (power user images 210a-n) and shared sessions 212a-n that allow a plurality of users to share access to virtualized resources. Virtualized resources may include virtualized desktops, operating systems, applications, or any virtualized software or hardware resource. In some embodiments, the hosting servers 106c-106d are "multi-tenant" servers in that they provide access to users of different organizations.

In some embodiments, the service broker machine 106a, the management machine 106e, and the provisioning machine 106f are associated with or maintained by a first organization and the directory server 106b and the hosting servers 106c are associated with or maintained by a second organization. The second organization may be, by way of example and without limitation, a service provider providing customers with access to virtualized resources.

Figure 2B:
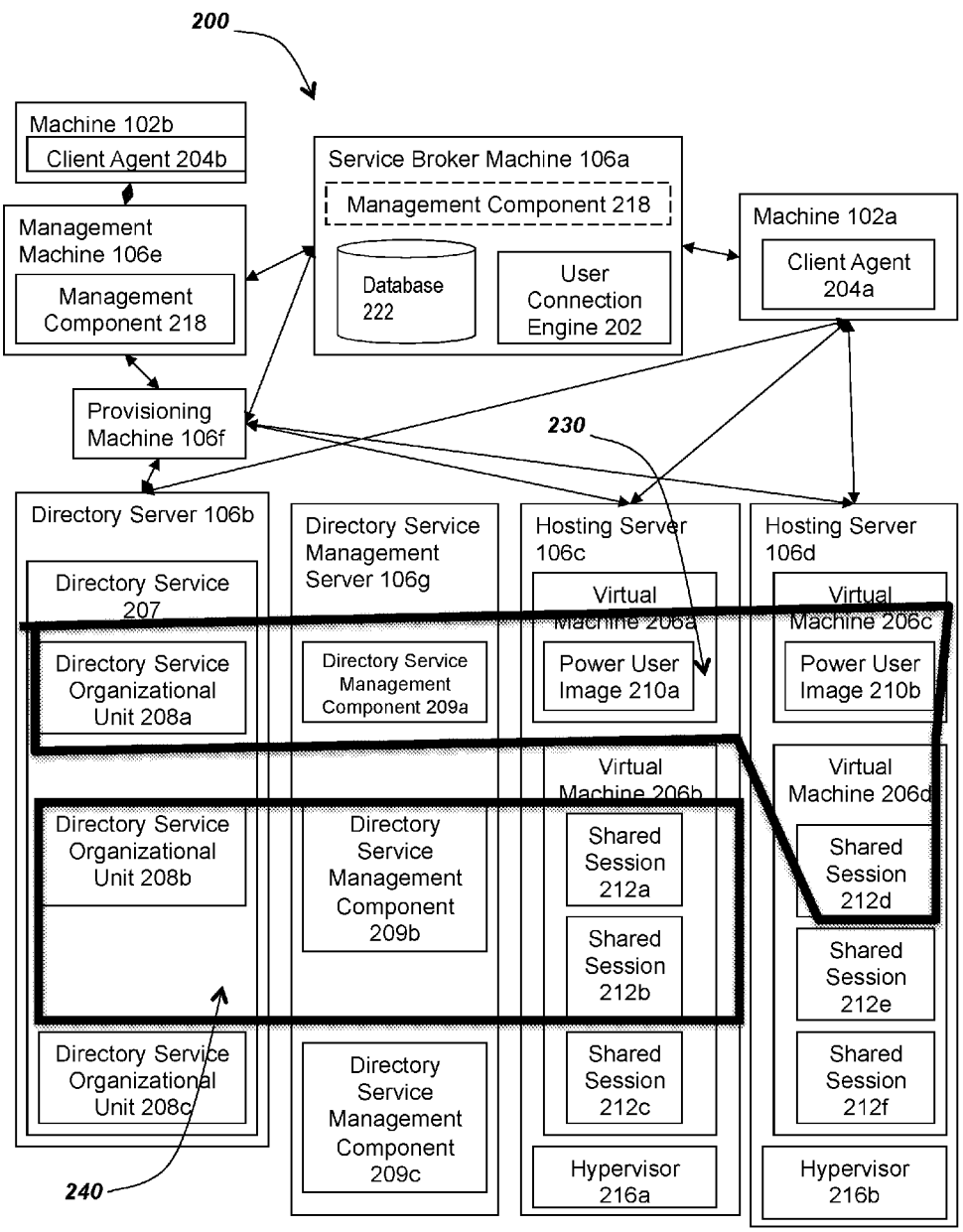
FIG. 2B is a block diagram depicting an embodiment of a system for provisioning a virtual resource in a mixed-use server.

Referring now to FIG. 2B, a block diagram depicts one embodiment of a system for provisioning a virtual resource in a mixed-use server. FIG. 2B depicts, by way of example and without limitation, a first plurality of resources 230 associated with a first entity and a second plurality of resources 240 associated with a second entity. As depicted in FIG. 2B, the first plurality of resources 230 includes a directory service organizational unit 208a provided on a directory server 106b within a directory service 207, a power user image 210a executing on a virtual machine 206a (which itself executes on a hosting server 106c), a power user image 210b executing on a virtual machine 206c (which itself executes on a hosting server 106d), and a shared session 212d provided by a virtual machine 206d (which itself also executes on the hosting server 106d). Although the three resources are provided on three different machines (which themselves may reside in the same or different data centers on the same or different networks), from the perspective of the first entity, the plurality of resources 230 form a single logical structure. In such an embodiment, each server or group of servers designated for use by a discrete organization is visible only to that organization, despite its configuration as part of a larger network segment. Similarly, the second plurality of resources 240 includes a directory service organizational unit 208b on a directory server 106b and a plurality of shared sessions 212a-b executing on a hosting server 106c; from the perspective of the second entity, the plurality of resources 240 form a single logical structure. In some embodiments, the plurality of resources may be considered a "virtual VLAN." In one of these embodiments, the virtual VLAN provides virtual machine level separation between virtual server systems that reside on the same network segment. This reduces configuration time for administrators, reduces complexity of hypervisor system management, provides a securely defined "walled garden" for each customer entity, and provides an additional security subdivision to enhance existing VLAN and subnetting practices.

Although referred to herein as engines, agents, and components, the elements depicted in FIGS. 2A-2B may each be provided as software, hardware, or a combination of the two, and may execute on one or more machines 100 as described above in FIGS. 1A-1D. Although certain components described herein are depicted as separate entities, for ease of discussion, it should be understood that this does not restrict the architecture to a particular implementation. For instance, the functionality of some or all of the described components may be encompassed by a single circuit or software function; as another example, the functionality of one or more components may be distributed across multiple components.

Figure 3A:
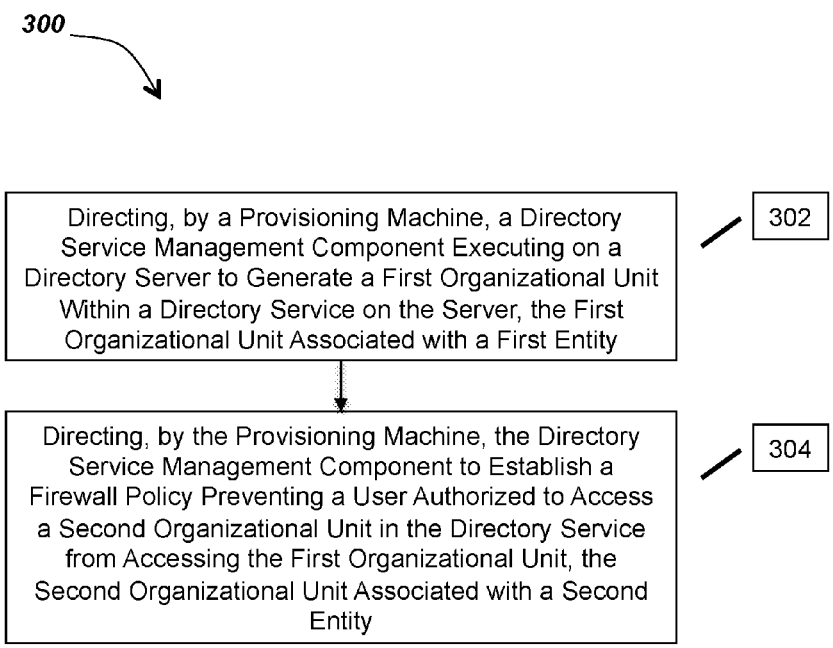
FIG. 3A is a flow diagram depicting an embodiment of a method for generating a secured organizational unit within a multi-tenant directory service.

Referring now to FIG. 3A, a flow diagram depicts one embodiment of a method 300 for generating a secured organizational unit within a multi-tenant directory service. In brief overview, the method 300 includes directing, by a provisioning machine, a directory service management component executing on a directory server to generate a first organizational unit within a directory service on the server, the first organizational unit associated with a first entity (302). The method 300 includes directing, by the provisioning machine, the directory service management component to establish a firewall policy preventing a user authorized to access a second organizational unit in the directory service from accessing the first organizational unit, the second organizational unit associated with a second entity (304).

The method 300 includes directing, by a provisioning machine, a directory service management component executing on a directory server to generate a first organizational unit within a directory service on the server, the first organizational unit associated with a first entity (302). In an alternative embodiment, the provisioning machine 106f communicates with the directory service 207 to generate the organizational unit 208 directly.

In one embodiment, the provisioning machine 106f creates a new instance of the directory service management component 209 that executes on a directory service management server 106g. In another embodiment, the provisioning machine 106f transmits an instruction to an already-executing instance of the directory service management component 209 on the directory service management server 106g. In one embodiment, the directory service management server 106g is provided as a WINDOWS ACTIVE DIREC- TORY domain controller. In another embodiment, the directory service management component 209 is configured in conjunction with provisioning a virtual machine 206. In still another embodiment, a configuration setting on the directory services management server 106g allows for the configuration of the directory service management component 209.

In one embodiment, the directory service management server 106g is not limited to providing directory service management functionality. In another embodiment, the directory service management server 106g provides functionality for authenticating users. In still another embodiment, the directory service management server 106g provides functionality for accessing or modifying user group membership information. In another embodiment, the directory service management server 106g provides functionality for accessing or modifying user and group data resource access permissions. In yet another embodiment, the directory service management server 106g provides functionality for accessing or modifying user and group peripheral device access permissions.

In one embodiment, the directory service management component 209 transmits a command to generate an organizational unit to the directory service 207 according to an API provided by the directory service 207. In still another embodiment, the organizational unit is a subdivision of a single directory service 207. In yet another embodiment, the provisioning machine 106f directs the directory service management component 209 to transmit the command in advance of an entity requesting that the provisioning machine 106f establish the organizational unit. For example, the provisioning machine 106f may have the directory service management component 209 generate a placeholder organizational unit so that when a new request for an organizational unit does come in, the organizational unit is already available. In some embodiments, generating the organizational unit prior to the request for the organizational unit provides a faster, more efficient provisioning process.

The method 300 includes directing, by the provisioning machine, the directory service management component to establish a firewall policy preventing a user authorized to access a second organizational unit in the directory service from accessing the first organizational unit, the second organizational unit associated with a second entity (304). In one embodiment, the directory service management component 209 transmits a command to the directory server 106b according to an API provided by an operating system executing on the directory server 106b.

In one embodiment, the directory service management component 209 deploys one or more firewall rules during a provisioning process to provide a private remote resource for an organization. In another embodiment, the directory service management component 209 transmits commands to configure firewall rules according to policies and uses a component of an operating system executing on the directory server 106b to control server system configuration routines at the level of each organizational unit. For example, the directory service management component 209 may configure firewall rules according to policy elements and may use WINDOWS Group Policy Engine to control server system configuration routines at the level of each organization unit. As another example, the directory service management component 209 may transmit an instruction to execute a script that enables the firewall policies. As another example, the directory service management component 209 accesses a policy object of the organizational unit that defines at least one attribute of an entity using the organizational unit (e.g., an end-user's company), including an identification of at least one server that is available for users of the organizational unit. In such an example, the directory service management component 209 modifies the policy object of the organizational unit to include at least one firewall rule that would prevent unauthorized users from accessing the resources of the organizational unit (e.g., the servers available to the users) even if the unauthorized users have access to other organizational units within the directory service 207; the operating system for the directory server 106b receives a notification of the modification to the policy object and updates a firewall of the virtual machine 206a-n to reflect the modification. As another example, the directory service management component 209 modifies the policy object of the organizational unit to include at least one firewall rule that would prevent unauthorized users from accessing the resources of the organizational unit (e.g., data within the organizational unit) even if the unauthorized users have access to other organizational units within the directory service 207; the operating system for the directory server 106b receives a notification of the modification to the policy object and updates a firewall of the directory server 106b to reflect the modification. In some embodiments, providing a multi-tenant directory service while also establishing the firewall rules needed to secure each tenant's data enables service providers implementing the methods and systems described herein to provide more flexible, secure resources while fully leveraging their physical resources. In one of these embodiments, the methods and systems described herein provide functionality ensuring that resources (including, for example, user, application, and data resources), while controlled by a shared directory service 207, are only visible and accessible to authorized users.

As described above, the methods and systems described herein provide functionality for provisioning resources for different organizations within logically distinct portions of the same physical machines. Once provisioned, the methods and systems described herein provide functionality for establishing a connection between an end user machine and a server hosting provisioned resources, including mixed-use servers that can provide different types of virtualized resources to different types of users. In some embodiments, the methods and systems described herein provide functionality, through a combination of the service broker machine 106a and virtual machines 206a-n that enables the provisioning of different types of virtualized resources in multi-tenant servers. Such functionality may enable service providers to offer a one-to-one desktop experience to the end user, utilizing various types of server operating systems, and shared hardware resources, while maintaining compliance with licensing requirements of the various server operating system manufacturers.

Figure 3B:
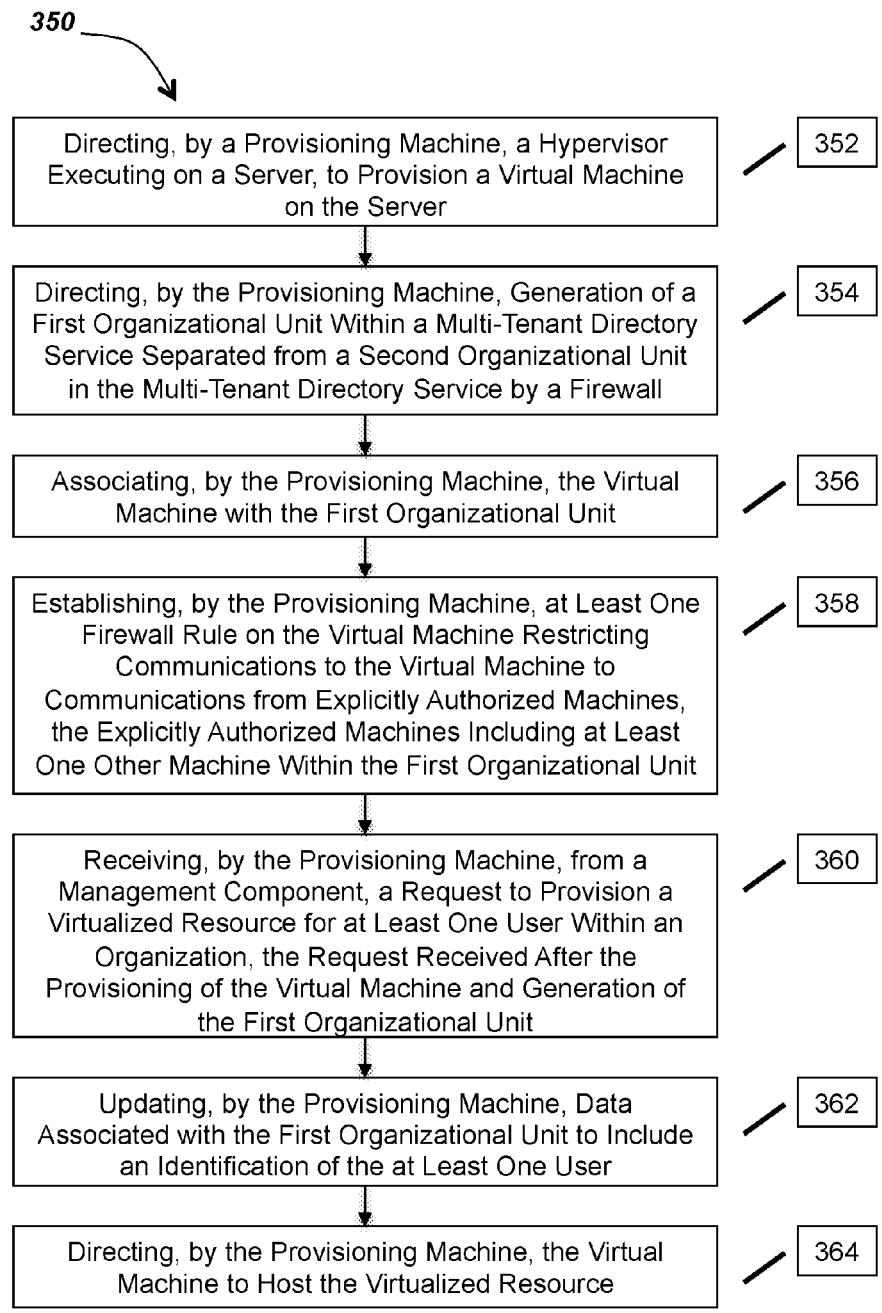
FIG. 3B is a flow diagram depicting an embodiment of a method for provisioning a virtualized resource in a mixed-use virtualization environment.

Referring now to FIG. 3B, a flow diagram depicts one embodiment of a method 350 for provisioning a virtual resource in a mixed-use environment. The method 350 includes directing, by a provisioning machine, a hypervisor executing on a server, to provision a virtual machine on the server (352). The method 350 includes directing, by the provisioning machine, the generation of a first organizational unit within a multi-tenant directory service separated from a second organizational unit in the multi-tenant directory service by a firewall (354). The method 350 includes associating, by the provisioning machine, the virtual machine with the first organizational unit (356). The method 350 includes establishing, by the provisioning machine, at least one firewall rule on the virtual machine restricting communications to the virtual machine to communications from explicitly authorized machines, the explicitly authorized machines including at least one other machine within the first organizational unit (358). The method 350 includes receiving, by the provisioning machine, from a management component, a request to provision a virtualized resource for at least one user within an organization, the request received after the provisioning of the virtual machine and generation of the first organizational unit (360). The method 350 includes updating, by the provisioning machine, data associated with the first organizational unit to include an identification of the at least one user (362). The method 350 includes directing, by the provisioning machine, the virtual machine to host the virtualized resource (364).

Referring now to FIG. 3B in greater detail, and in connection with FIGS. 2A-2B and 3A, the method 350 includes directing, by a provisioning machine, a hypervisor executing on a server, to provision a virtual machine on the server (352). In one embodiment, the provisioning machine 106*f* transmits an instruction to provision the virtual machine to the hypervisor 216*a* executing on a hosting server 106*c*.

The method 350 includes directing, by the provisioning machine, the generation of a first organizational unit within a multi-tenant directory service separated from a second organizational unit of the multi-tenant directory service by a firewall (354). In one embodiment, the provisioning machine 106*f* directs a directory service management component 209 to instruct a directory service to generate the first organizational unit. In some embodiments, the provisioning machine 106 directs the generation of the organizational unit as described above in connection with FIG. 3A.

The method 350 includes associating, by the provisioning machine, the virtual machine with the first organizational unit (356). In one embodiment, the provisioning machine 106*f* directs the directory service management component 209 to make the association. In another embodiment, the directory service management component 209 instructs the directory service 207 to modify data associated with the first organizational unit to include an identification of the virtual machine. In another embodiment, the directory service management component 209 makes the modification to the first organizational unit itself; for example, the directory service management component 209 may modify the first organizational unit to list (e.g., within a policy object) a machine name of the virtual machine as a machine designated to provide access to virtual resources for members of the organizational unit.

The method 350 includes establishing, by the provisioning machine, at least one firewall rule on the virtual machine restricting communications to the virtual machine to communications from explicitly authorized machines, the explicitly authorized machines including at least one other machine within the first organizational unit (358). In one embodiment, the provisioning machine 106*f* directs the directory service management component 209 to establish the at least one firewall rule. In another embodiment, the service broker machine 106*a* establishes the firewall rule as described above in connection with FIG. 3A.

In one embodiment, after directing the generation of the directory service organizational unit 208*a* and the virtual machine 206, the provisioning machine 106*f* marks the virtual machine 206 as available for hosting virtual resources. For example, the provisioning machine 106*f* may update a table of virtual machines that are available for hosting virtual resources.

The method 350 includes receiving, by the provisioning machine, from a management component, a request to provision a virtualized resource for at least one user within an organization, the request received after the provisioning of the virtual machine and generation of the first organizational unit (360). In one embodiment, the provisioning machine 106*f* receives the request from the management component 218. In another embodiment, the provisioning machine 106*f* receives a request to provision a virtualized resource as either dedicated to a single user (e.g., as a power user image 210) or as available for use by multiple users (e.g., a shared session 212). In some embodiments, the request includes an identification of a type of resource to be provisioned. For example, and as indicated above, the resource may be a virtual desktop, virtual machine, virtualized application, or other virtualized resource. In other embodiments, the instruction includes an identification of a characteristic a virtual machine 206 should have in order to host the virtualized resource (e.g., an amount of memory, a level of processing power, or a number of sessions available).

In one embodiment, the provisioning machine 106*f* receives user information in the request, the user information identifying one or more users to be authorized to access the virtualized resource. In another embodiment, the provisioning machine 106*f* forwards the user information to the directory service management component 209. For example, user information may include a username associated with at least one user. In such an instance, the provisioning machine 106*f* may generate a resource username associated with the received username for use when accessing the virtualized resource; the provisioning machine 106*f* may store the resource username in the directory service organizational unit 208 for the organization the user belongs to. As another example, user information may include a type or level of service associated with the user. For instance, an administrator initially provisioning a user account may designate the user as a power user and have the designation stored with other user account information, which causes the system 200 to create a virtualized resource (e.g., the power user image 210*a*) for the exclusive use of the user, rather than shared among multiple users. In some embodiments, previously-provisioned users, which were initially provisioned to share virtual resources, may subsequently be designated as power users, e.g., through the management component 218, which may queue a workflow request in an administrative workflow manager to build a new server instance; configure firewall rules; install applications; and activate the server for the exclusive use of the newly designated power user. In one of these embodiments, the directory service management component 209*a* receives a request for a modification to a directory service organizational unit 208*a* and modifies the organizational unit 208*a* accordingly. In another of these embodiments, the directory service management component 209*a* monitors (periodically or continuously) for incoming change requests and modifies the organizational unit 208*a* accordingly.

The method 350 includes updating, by the provisioning machine, data associated with the first organizational unit to include an identification of the at least one user (362). In one embodiment, the provisioning machine 106*f* directs the directory service management component 209 to update the data associated with the first organizational unit. In another embodiment, the directory service management component 209 transmits, to the directory service 207, an instruction to modify data associated with the first organizational unit to include an identification of the at least one user.

The method 350 includes directing, by the provisioning machine, the virtual machine to host the virtualized resource (364). In one embodiment, the provisioning machine 106*f* transmits, to a virtual machine 206 executing on the hosting server 106c, an instruction to host the virtualized resource. In some embodiments, the provisioning machine 106f may receive an instruction to make a number of virtualized resources of a particular type available (e.g., make three power user images 210 available for organization XYZ identified in the directory service organizational unit 208a; make six shared sessions 212 available for organization ABC identified in directory service organizational unit 208b) and will instruct one or more virtual machines 206 to provision the virtualized resources. In some embodiments, a service provider administrator managing at least one hosting server 106c modifies at least one firewall rule to authorize the provisioning machine 106f to communicate with the hypervisor 216a in order to provision and manage virtual machines 206a-n. In other embodiments, the provisioning machine 106f includes functionality for translating a command into a format a particular hypervisor 216a can process. For example, different hosting servers 106c-n may execute different types of hypervisors 216 and the functionality of the provisioning machine 106f allows it to translate a command into the appropriate format for a particular hypervisor.

In one embodiment, the provisioning machine 106f provides the management component 218 with an indication that the provisioning machine 106f has completed the provisioning process. In another embodiment, the provisioning machine 106f provides the management component 218 an identification of a user interface available for managing firewall rules for users of the provisioned resource (typically within a discrete organizational unit). The user interface may be provided as part of a remote desktop services workflow management platform for the purpose of modifying rules for individual server systems after the initial rules are established. The interface allows a services administrator to make changes to allow for specific inter-server communications, but will prevent the administrator from breaking the fundamental firewall principles, which prevent each organizational unit from any unauthorized connection to other servers within the same VLAN.

Figure 4:
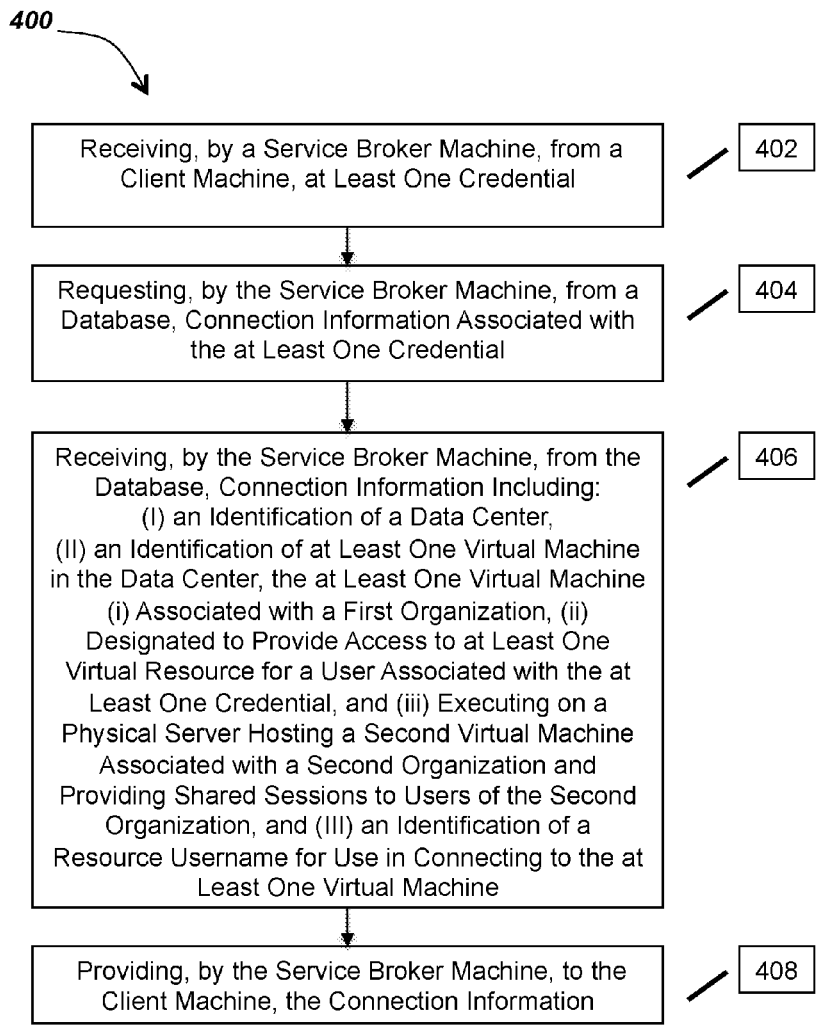
FIG. 4 is a flow diagram depicting an embodiment of a method for providing access to a virtualized resource in a mixed-use server.

Referring now to FIG. 4, a flow diagram depicts one embodiment of a method 400 for providing access to a virtual resource in a mixed-use server. The method 400 includes receiving, by a service broker machine, from a client machine, at least one credential (402). The method 400 includes requesting, by the service broker machine, from a database, connection information associated with the at least one credential (404). The method 400 includes receiving, by the service broker machine, from the database, connection information including: (I) an identification of a data center, (II) an identification of at least one virtual machine in the data center, the at least one virtual machine (i) associated with a first organization, (ii) designated to provide access to at least one virtual resource for a user associated with the at least one credential, and (iii) executing on a physical server hosting a second virtual machine associated with a second organization and providing shared sessions to users of the second organization, and (III) an identification of a resource username for use in connecting to the at least one virtual machine (406). The method 400 includes providing, by the service broker machine, to the client machine, the connection information (408).

Referring now to FIG. 4 in greater detail, and in connection with FIGS. 2A-2B and 3, the method 400 includes receiving, by a service broker machine, from a client machine, at least one credential (402). In one embodiment, the service broker machine 106a receives the at least one credential from the client agent 204a on the machine 102a. In another embodiment, the user connection engine 202 receives the at least one credential. In some embodiments, the service broker machine 106a receives the at least one credential and infers a request for access to a virtual resource. In some embodiments, as indicated above, the service broker machine 106a validates, with a database 222, a user associated with the at least one credential. In one embodiment, the credential includes biometric information associated with a user of the client machine 102. In another embodiment, the credential includes a password. The method 400 includes requesting, by the service broker machine, from a database, connection information associated with the at least one credential (404).

The method 400 includes receiving, by the service broker machine, from the database, connection information including: (I) an identification of a data center, (II) an identification of at least one virtual machine in the data center, the at least one virtual machine (i) associated with a first organization, (ii) designated to provide access to at least one virtual resource for a user associated with the at least one credential, and (iii) executing on a physical server hosting a second virtual machine associated with a second organization and providing shared sessions to users of the second organization, and (III) an identification of a resource username for use in connecting to the at least one virtual machine (406). In one embodiment, the service broker machine 106a receives the connection information. In another embodiment, the user connection engine 202 receives the connection information. In one embodiment, the connection information includes an identification of a gateway associated with the data center.

The method 400 includes providing, by the service broker machine, to the client machine, the connection information (408). In one embodiment, the service broker machine 106a provides the identification and the instruction to the client agent 204a. In one embodiment, the service broker machine 106a logs an identifier of the client machine 102. In one embodiment, the service broker machine 106a logs an identifier of an IP address from which the client machine 102 connected to the service broker machine 106a. In some embodiments, the service broker machine 106a is dedicated to receiving client credentials and to automatically returning the information the client 102 needs to connect to a virtualized resource, without requiring the client 102 to provide any information about itself other than the credentials.

In another embodiment, the client agent 204a connects to the identified virtual machine and provides a user of the machine 102a with access to the virtualized resource. In one embodiment, the client agent 204a uses an identification of a gateway received in the connection information to connect to the identified data center with a request for access to the identified virtual machine. In another embodiment, the gateway redirects the client agent 204a to a load balancing machine (not shown). In still another embodiment, the load balancing machine determines which of a plurality of virtual machines designated to provide access to the user of the client agent 204a is available. In yet another embodiment, the load balancing machine redirects the client agent 204a to a particular virtual machine hosting the virtualized resources.

In some embodiments, the methods and systems described herein provide functionality for securely provisioning, and establishing connections to, virtualized resources in mixed-use servers.

It should be understood that the systems described above may provide multiple ones of any or each of those components and these components may be provided on either a standalone machine or, in some embodiments, on multiple machines in a distributed system. The phrases 'in one embodiment,' 'in another embodiment,' and the like, generally mean that the particular feature, structure, step, or characteristic following the phrase is included in at least one embodiment of the present disclosure and may be included in more than one embodiment of the present disclosure. Such phrases may, but do not necessarily, refer to the same embodiment.

The systems and methods described above may be implemented as a method, apparatus, or article of manufacture using programming and/or engineering techniques to produce software, firmware, hardware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be LISP, PROLOG, PERL, C, C++, C#, JAVA, or any compiled or interpreted programming language.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of computer-readable devices, firmware, programmable logic, hardware (e.g., integrated circuit chip; electronic devices; a computer-readable non-volatile storage unit; non-volatile memory, such as semiconductor memory devices, including EPROM, EEPROM, and flash memory devices; magnetic disks such as internal hard disks and removable disks; magneto-optical disks; and CD-ROMs). Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium. A computer may also receive programs and data from a second computer providing access to the programs via a network transmission line, wireless transmission media, signals propagating through space, radio waves, infrared signals, etc.

Having described certain embodiments of methods and systems for provisioning a virtual resource in a mixed-use server, it will now become apparent to one of skill in the art that other embodiments incorporating the concepts of the disclosure may be used. Therefore, the disclosure should not be limited to certain embodiments, but rather should be limited only by the spirit and scope of the following claims.

What is claimed is:

1. A service broker machine for providing access to a virtualized resource in a mixed-use virtualization environment, the service broker machine comprising:
  a processor configured to execute:
    a user connection engine: (i) executing a web service for receiving, from a client machine, at least one credential (ii) requesting, from a database, connection information associated with the at least one credential, and (iii) receiving, from the database, connection information including:
      I. an identification of a data center,
      II. an identification of at least one virtual machine in the data center, the at least one virtual machine associated with a first organization, designated to provide access to at least one virtual resource for a user associated with the at least one credential, and executing on a physical server hosting a second virtual machine associated with a second organization and providing shared sessions to users of the second organization, and
      III. an identification of a resource username for use in connecting to the at least one virtual machine;
    a management component (i) transmitting, to a provisioning machine, a request for provisioning of the identified at least one virtual machine, the request including an identifying of a type of resource be provisioned and user information associated with the user and (ii) receiving an indication that the requested virtualized resource has been provisioned; and
    a transmitter providing, to the client machine, the connection information, wherein the physical server establishes a connection between the client machine and the at least one virtual machine, providing the at least one virtual resource to the user based on the connection information.

2. The service broker machine of claim 1, wherein the connection information includes an identification of a gateway associated with the data center.

3. The service broker machine of claim 1 further comprising a log identifying a date on which the service broker machine received the at least one credential.

4. The service broker machine of claim 1 further comprising a log storing an identifier of the client machine.

5. The service broker machine of claim 1 further comprising a log storing an identifier of an IP address from which the client machine connected to the service broker machine.

6. The service broker machine of claim 1, wherein the at least one credential further comprises biometric information associated with a user of the client machine.

7. The service broker machine of claim 1, wherein the at least one credential further comprises a password.

* * * * *

UNITED STATES PATENT AND TRADEMARK OFFICE
CERTIFICATE OF CORRECTION

PATENT NO. : 9,977,692 B2  
APPLICATION NO. : 15/416024  
DATED : May 22, 2018  
INVENTOR(S) : Buck et al.

Page 1 of 1

It is certified that error appears in the above-identified patent and that said Letters Patent is hereby corrected as shown below:

On the Title Page

Item (73), under "Assignee", in Column 1, Line 1, delete "COUDJUMPER CORPORATION," and insert -- CLOUDJUMPER CORPORATION, --, therefor.

In the Specification

In Column 1, Line 8, delete "is a is a" and insert -- is a --, therefor.

In Column 13, Line 36, delete "106cd" and insert -- 106d --, therefor.

Signed and Sealed this  
Twenty-first Day of August, 2018

Andrei Iancu  
*Director of the United States Patent and Trademark Office*